(12) United States Patent
Traynor et al.

(10) Patent No.: US 10,803,261 B2
(45) Date of Patent: Oct. 13, 2020

(54) DETECTING COUNTERFEIT MAGNETIC STRIPE CARDS USING ENCODING JITTER

(71) Applicant: University of Florida Research Foundation, Incorporated, Gainesville, FL (US)

(72) Inventors: Patrick G. Traynor, Gainesville, FL (US); David P. Arnold, Gainesville, FL (US); Walter N. Scaife, Gainesville, FL (US); Christian Peeters, Gainesville, FL (US); Camilo Velez Cuervo, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 234 days.

(21) Appl. No.: 15/961,060

(22) Filed: Apr. 24, 2018

(65) Prior Publication Data
US 2018/0314862 A1    Nov. 1, 2018

Related U.S. Application Data

(60) Provisional application No. 62/495,548, filed on May 1, 2017.

(51) Int. Cl.
*G06K 7/08* (2006.01)

(52) U.S. Cl.
CPC .................................. *G06K 7/087* (2013.01)

(58) Field of Classification Search
CPC ...... G06K 7/084; G06K 7/0166; G06K 19/10; G06K 7/0008; H03M 5/12; H04L 9/3247; H04L 2209/04; H04L 2209/56; H04L 9/002; H04L 9/3234; G06Q 20/085; G06Q 20/382; G06Q 20/3821; G06Q 20/401; G07F 7/082; G07F 7/1008; G11B 20/00086; G11B 20/00094; G11B 20/00123; G11B 20/00253; G11B 20/00557; G11B 20/00876; G11B 2220/17; G11B 20/0021; G11B 20/1419
USPC ...................................................... 235/449
See application file for complete search history.

(56) References Cited

U.S. PATENT DOCUMENTS

| 5,778,067 | A | 7/1998 | Jones et al. | |
|---|---|---|---|---|
| 2002/0017559 | A1* | 2/2002 | Mos | G06K 7/084 235/380 |
| 2010/0327060 | A1* | 12/2010 | Moran | G06K 19/086 235/440 |

OTHER PUBLICATIONS

Grassadonia, Brian, "Square Cash is Open for Business", Mar. 23, 2015, 4 pages, retrieved from <https://squareup.com/us/en/press/introducing-cashtags> on Sep. 18, 2018, 4 pages.

(Continued)

*Primary Examiner* — Thien M Le
*Assistant Examiner* — Tae W Kim
(74) *Attorney, Agent, or Firm* — Alston & Bird LLP

(57) ABSTRACT

Systems and methods for detecting counterfeit magnetic stripes are provided. A method can include detecting magnetic flux transitions encoded on a magnetic stripe and the variation in distances between clocking flux transitions. The distance between variations in clocking flux transitions is greater in counterfeit cards than in legitimate cards. The variations in distances can be compared with known values of legitimate cards to detect the presence of a counterfeit magnetic stripe.

9 Claims, 10 Drawing Sheets

(56) References Cited

OTHER PUBLICATIONS

PayPal. "Instant Money. Anytime. Anywhere." https://www.paypal.com/. Oct. 13, 1999 to Sep. 18, 2018, Internet Archive <https://web.archive.org/web/19991013140707/https://www.paypal.com>, 1 page.
Holmes, T. E. Payment Method Statistics. Creditcards.com—http://www.creditcards.com/credit-card-news/payment-method-statistics-1276.php, 2015, retrieved from Internet Archive at <https://web.archive.org/web/20150629110440/http://www.creditcards.com/credit-card-news/payment-method-statistics-1276.php> on Sep. 18, 2018, 6 pages.
Welcome to MagnePrintR : What is MagnePrint? http://www.magneprint.com/, Copyright 2013, 1 page.
"Some retailers balking at pump upgrade for EMV cards," NACS Daily, Oct. 2014, pp. 1-2.
Abrazhevich, "Classification and characteristics of electronic payment systems," International Conference on Electronic Commerce and Web Technologies, Sep. 2001, pp. 81-90.
Abrazhevich, "Electronic payment systems: a user-centered perspective and interaction design," Technische Universiteit Eindhoven, Jan. 2004, pp. 1-185.
Anderson et al., "EMV: Why payment systems fail," Communications of the ACM, Jun. 2014, pp. 24-28, vol. 57, No. 6.
Bond et al., "Chip and skim: cloning EMV cards with the pre-play attack," 2014 IEEE Symposium on Security and Privacy, May 2014, pp. 49-64.
Bresiger, "Unused gift cards total $44B since 2008: study," New York Post, Jan. 2014, pp. 1-2.
Chaum, "Achieving electronic privacy," Scientific American, Aug. 1992, pp. 1-15.
Clemons et al., "Reengineering money: the mondex stored value card and beyond," Proceedings of the 29th Annual Hawaii International Conference on System Sciences, Jan. 1996, pp. 254-261.
Corkery, "Wells Fargo fined $185 Million for fraudulently opening accounts," The New York Times, Sep. 2016, pp. 1-5.
Dautner, "Card fraud losses reach $21.84 billion in 2015," Payment Week, Oct. 2016, pp. 1-5.
Ruiter et al., "Formal Analysis of the EMV protocol suite," Theory of Security and Applications, Mar. 2011, pp. 113-129.
Drimer et al., "Keep your enemies close: distance bounding against smartcard relay attacks," Proceedings of the 16th USENIX Security Symposium, Aug. 2007, pp. 1-23.
Hamblen, "Chip card payment confusion, anger rages on: merchants blame card companies for delays in certifying EMV software," CheaperPay, May 2016, pp. 1-6.
Harrell, "Victims of identity theft, 2014," U.S. Department of Justice Bureau of Justice Statistics, Sep. 2015, pp. 1-25.
Karame et al., "Double-spending fast payments in bitcoin," Proceedings of the 2012 ACM Conference on Computer and Communications Security, Oct. 2012, pp. 906-917.
Krebs, "All about fraud: how crooks get the CVV," Krebs on Security, Apr. 2016, pp. 1-2.
Lucas, "Card makers look to fill their EMV dance card," Digital Transactions, Nov. 2013, pp. 1-6.
Mcquay, "Why you might not see an EMV-ready gas pump for a while," Nerdwallet, Sep. 2015, pp. 1-3.
Murdoch et al., "Chip and PIN is broken," 2010 IEEE Symposium on Security and Privacy, May 2010, pp. 433-446.
Nakamoto, "Bitcoin: a peer-to-peer electronic cash system," Metzdowd Cryptography Mailing List, Oct. 2008, pp. 1-9.
Neuman, "Proxy-based authorization and accounting for distributed systems," Proceedings of the 13th International Conference on Distributed Computing Systems, May 1993, pp. 283-291.
Nicol, "No expectation of privacy in bank records—United States V. Miller," DePaul Law Review, Jan. 1976, pp. 146-157, vol. 26, Article 9.
Reaves et al., "Mo(bile) money, mo(bile) problems: analysis of branchless banking applications in the developing world," Proceedings of the 24th USENIX Security Symposium, Aug. 2015, pp. 17-32.
Uriarte, "PayThink gift card fraud will be a major threat post-EMV," PaymentsSource, Jul. 2015, pp. 1-5.
ABC News. Credit card thieves caught on tape using skimmers, 2014. Available as a YouTube segment at https://www.youtube.com/watch?v=oAP7sVh4smc, 4 pages.
ABC News. JDFriend100. Cloning credit cards, 2009. Available at https://www.youtube.com/watch?v=ji49T5KwMbM, 2 pages.
ABC News. Why chip credit cards are still not safe from fraud, 2016. Available as a YouTube segment at https://www.youtube.com/watch?v=gJo9PfsplsY, 3 pages.
ACCPAconnection. Credit card skimming operation, 2008. Available on YouTube at https://www.youtube.com/watch?v=U0w_ktMotlo, 3 pages.
Anderson R., et al., "Viewpoints, EMV: Why Payment Systems Fail", *Communications of the ACM*, Jun. 2014, pp. 24-28, vol. 57, Issue 6, Association for Computing Machinery, New York.
Barnes International, "Magnetic Stripe Analyser", retrieved from http://www.barnestest.com/test-tools/magnetic-stripe-analysers/ (formerly http://www.barnestest.com/wpcontent/uploads/2014/10/Barnes-Mag-Tester-Revo-10-14.pdf.) on Nov. 28, 2018, 9 pages.
Drimer, S. And Murdoch, S. J., "Chip & PIN (EMV) relay attacks", University of Cambridge, Department of Computer Science and Technology, Security Group, 2013 Copyright, retrieved from https://www.cl.cam.ac.uk/research/security/banking/relay/ on Nov. 28, 2018, 5 pages.
FISERV, "Card Manufacturing", retrieved from https://www.fiserv.com/customer-channel-management/output-solutions/manufacture-cards.aspx (formerly https://www.fiserv.com/customer-channelmanagement/output-solutions/card-manufacturing.aspx.) on Nov. 28, 2018, 2 pages.
Gerätetechnik, Rinas, Aftholderberg, "HWR MagStripe production at 15,000 cph.avi", 2011. Available on YouTube at https://www.youtube.com/watch?v=-QiYUOu7mrA, 2 pages.
ISO/IEC. Identification cards—recording technique—magnetic stripe—low coercivity. 7811-2:2014(E), 2014, 8 pages.
ISO/IEC. Identification cards—recording technique—magnetic stripe—high coercivity. 7811-6:2014/(E), 2014, 11 pages.
J.P. Morgan Chase. FAQ: Chip-enabled card acceptance (EMV). Retrieved from https://merchantservices.chase.com/support/product-support/faq-emv-chip-card-technology (formerly https://www.chasepaymentech.com/faq_emv_chip_card_technology.html), 2016, 5 pages.
Johansen, T. H., et al., "Magneto-Optical Imaging, Nato Science Series II", 2012, Springer, Netherlands.
Lycroft, Eugenia, "Carding, skimming reportage: American Underworld", 2012, available on YouTube at https://www.youtube.com/watch?v=k_brU9Jwhww, 3 pages.
Manasse, M. S., et al., "The Millicent Protocols for Electronic Commerce", In USENIX Workshop on Electronic Commerce, usenix.org, 1995, retrieved from https://www.w3.org/Conferences/WWW4/Papers/246/ on Nov. 28, 2018, 20 pages.
Matesy, "Magnetic Field Visualization", retrieved from https://matesy.de/en/products/magnetic-field-visualization (formerly http://www.matesy.de/en/products/magnetic-fieldvisualization/) on Nov. 28, 2018, 7 pages.
Medvinsky, G., et al., "NetCash: A design for practical electronic currency on the Internet", In Proceedings of the 1st ACM Conference on Computer and Communications Security, Nov. 1993, pp. 102-106, U.S.
Meiklejohn, S., "If privacy matters, cash is still king", The New York Times, 2013, retrieved from https://www.nytimes.com/roomfordebate/2013/12/09/the-end-of-cash/if-privacy-matters-cash-is-still-king on Nov. 29, 2018.
Neuman B. C., et al., "Requirements for Network Payment: the NetCheque Perspective", In Compcon '95, Technologies for the Information Superhighway, Digest of Papers, 1995, pp. 32-36, IEEE, U.S.
O'Mahony, D., et al., "Electronic Payment Systems", 1997, 271 pages, Artech House, Inc., U.S.

(56) References Cited

OTHER PUBLICATIONS

O'Mahony, D., et al., "Electronic Payment Systems", EDPACS: The EDP Audit, Control, and Security Newsletter, 1997, pp. 18-19, Taylor & Francis Group, U.K.

Panurach, P., "Money in Electronic Commerce: Digital cash, electronic fund transfer, and Ecash", Communications of the ACM, Jun. 1996, pp. 45-50, vol. 39, Issue 6, ACM, Inc., U.S.

Patterson, W. C., et al., "A Magneto-Optical Microscope for Quantitative Measurement of Magnetic Microstructures", Review of Scientific Instruments, 2015, pp. 094704-1 thru 8094704-9, vol. 6, Issue 9, AIP Publishing, U.S.

Wayner, Peter, "Digital Cash (2nd Ed.): Commerce on the Net", Academic Press Professional, Inc., 1997, San Diego, CA, U.S.

\* cited by examiner

TABLE I: Gift/Stored Value Card Experimental Results

| Quality | ID | Card Type | # Cards | # Good Swipes | Finish | Reloadable | Accuracy | TPR | FPR |
|---|---|---|---|---|---|---|---|---|---|
| Low | 0 | Open (Visa) | 100 | 1,970 | Matte | No | 96.8% | 93.4% | 6.7% |
|  | 1 | Open (Visa) | 100 | 1,990 | Matte | No | 93.7% | 85.8% | 14.2% |
| High | 2 | Open (MasterCard) | 100 | 2,000 | Glossy | Yes | 99.2% | 98.6% | 1.7% |
|  | 3 | Open (Visa) | 100 | 1,990 | Glossy | Yes | 98.5% | 96.9% | 2.6% |
|  | 4 | Closed | 250 | 4,969 | Glossy | Yes | 99.9% | 99.3% | 0.6% |

DETECTING COUNTERFEIT MAGNETIC STRIPE CARDS USING ENCODING JITTER

CROSS-REFERENCE TO RELATED APPLICATION

This application claims the benefit of U.S. Provisional Application Ser. No. 62/492,548, filed May 1, 2017, which is incorporated herein by reference in its entirety, including any figures, tables, and drawings.

GOVERNMENT SUPPORT

This invention was made with government support under grant number 1526718 awarded by the National Science Foundation. The government has certain rights in the invention.

BACKGROUND

Magnetic stripe cards, including but not limited to credit, debit and gift cards, present a convenient method for conducting consumer and commercial transactions in modern society. The growth of e-commerce has further necessitated the need for the ability to securely conduct financial transactions through electronic methods.

The ubiquitous nature of magnetic stripe cards, coupled with inadequate safeguards, has invited adversaries to develop methods to copy or clone magnetic stripe cards. The relative ease with which weak points can be identified and exploited creates a demand for new and innovative procedural safeguards. The financial and retail industries have attempted to strengthen magnetic card integrity though adoption of EMV (Europay, MasterCard, and Visa) standards ("Chip and PIN" or "Chip and Signature"). However, deployment of EMV standards has been hampered by manufacturing costs and existing cards that cannot be replaced. A better and more innovative solution to physically replacing cards is to identify counterfeit magnetic stripe cards through measurement and comparison of variations in the width of the clocking flux transitions on the magnetic stripe.

BRIEF SUMMARY

Embodiments of the subject invention provide devices, protocols, and methods for detection of counterfeit magnetic stripe cards. Methods can be designed to detect the presence of counterfeit magnetic stripe cards including but not limited to credit cards, debits cards, and gift cards (open-loop and closed-loop). The protocols and methods of described herein present new opportunities for vendors to discourage creation of cloned magnetic stripe cards and prevent or inhibit fraudulent transactions. Experimental analysis and simulations have shown that the device can accurately detect the presence of variations between clock fluctuations of legitimate and counterfeit magnetic stripes.

In an embodiment, a method of detecting counterfeit magnetic stripes comprises using magneto-optical imaging (MOI) techniques for imaging the magnetic field across the magnetic stripe, processing the image to recover clocking flux transitions, measuring the width of clock transitions, and processing the data. Analysis and experimentation demonstrate that variations in the widths of clocking flux transitions, hereinafter referred to as "jitter," in counterfeit cards are greater than the widths of clocking flux transitions in original cards. The difference in jitter can be attributable to decreased quality control and inferior machinery used in fabricating counterfeit cards.

In another embodiment, a method of detecting counterfeit magnetic stripes comprises using a reader connected to an audio sink to scan the magnetic stripe of a card. As the read head scans the magnetic stripe, a voltage waveform is generated, in accordance with Faraday's Law. The peaks of the waveforms represent the magnetic flux transitions encoded on the magnetic stripe. Using these waveform peaks as reference points, the voltage waveform can be processed and the distance between peaks can be used to measure the jitter on a particular magnetic stripe.

The methods and devices described herein: (1) can be deployed at point of sale without further modification or replacement of existing magnetic stripe cards; (2) offer broader applicability to include cards that do not merit costs of introduction of EMV standards (e.g., gift cards, copy cards); and (3) have a low cost of implementation with most point of sales systems, creating a more attractive alternative to adoption of EMV standards.

DETAILED DESCRIPTION

Legitimate magnetic stripe cards are generally fabricated in quality controlled environments encoded with data using a frequency/double frequency (F2F) technique. The F2F technique encodes binary data magnetically onto the magnetic stripes through flux transitions. These flux transitions occur at least once during the rising edge of the clock cycle. A single flux transition in a full clock cycle is as expressed as decoded binary 0. An additional flux transition occurring at the falling edge of the clock cycle expresses a decoded binary 1.

Figure 1:
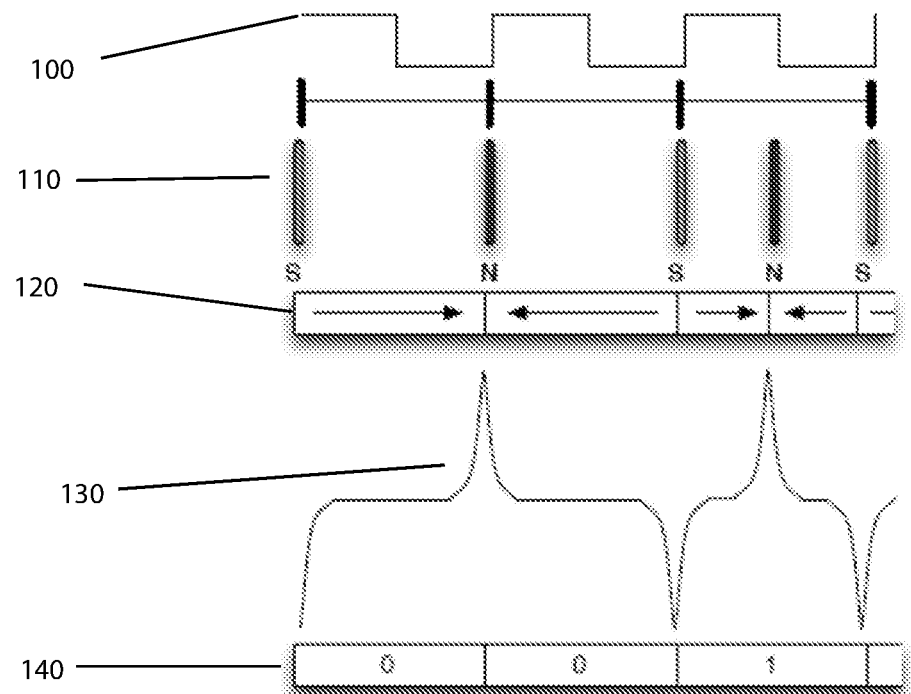
FIG. 1 shows a diagram of a clock cycle's relations to plain text under F2F encoding.
Figure 3:
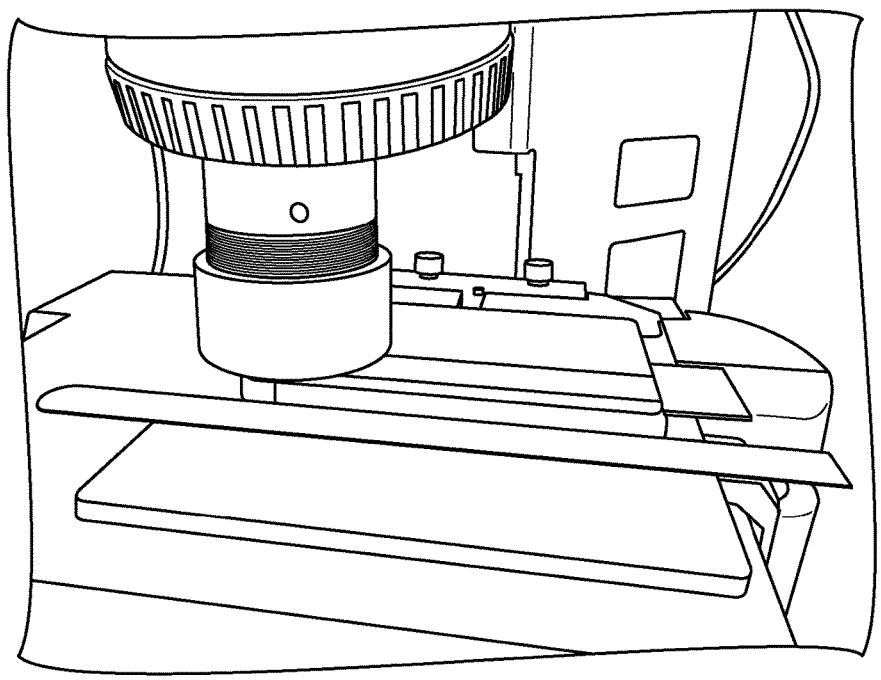
FIG. 3 shows an image of a magneto-optical microscope.

FIG. 1 illustrates how a shift in the magnetic polarity during the half or full clock cycle translates to a binary 0 or 1. A magneto-optical microscope, as seen in FIG. 3, can scan across a magnetic stripe and measure a change in the magnetic polarity 110 at each full or half clock cycle 100. The magnetic polarity can be visually described across a magnetic stripe 120 with directional arrows. The signals 130 received by the magneto-optical microscope from the magnetic stripe can be decoded into binary 0's or 1's 140. If the magnetic polarity shifts after a full clock cycle a binary 0 can denoted. Otherwise if the magnetic polarity shifts after a half clock cycle, a binary 1 can be denoted.

Although the F2F encoding process can be expected to generate near uniform width of clock cycles across the magnetic stripe, variations (i.e., jitter) in the physical length (the bit length) do occur. Jitter is a naturally occurring phenomenon of the manufacturing process. ISO/IEC (International Organization for Standardization (ISO)/International Electrotechnical Commission (IEC)) standards allow for an acceptable variation rate of +/−10%. Experimental results demonstrate that the length of variations in the width of clock cycles in counterfeit magnetic stripes exceed the length of variations of magnetic stripes produced in quality controlled environments. This variation in jitter can be exploited to differentiate an original card from a counterfeit card.

Figure 2:
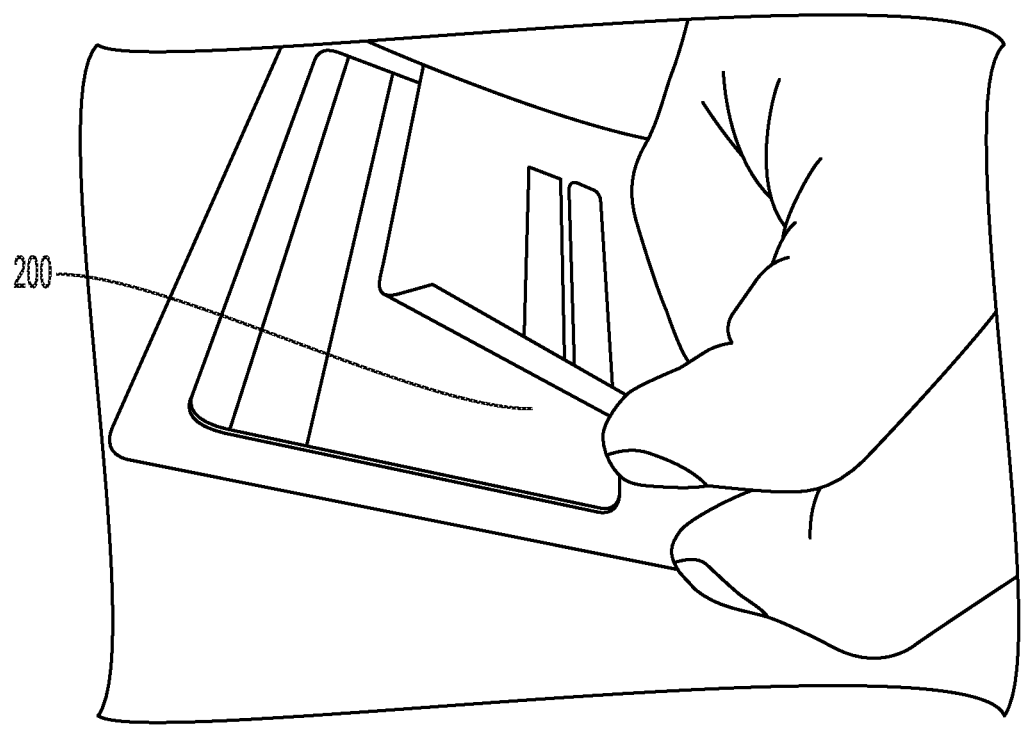
FIG. 2 shows an image of a retail gift card with an exposed PIN number.

FIG. 2 is an image of a gift card purchased at retail with an unmasked personal identification number (PIN) 200 hidden behind a paper sleeve. These PINs can be easily copied by an adversary, is purchased to steal the card's funds.

Figure 4:
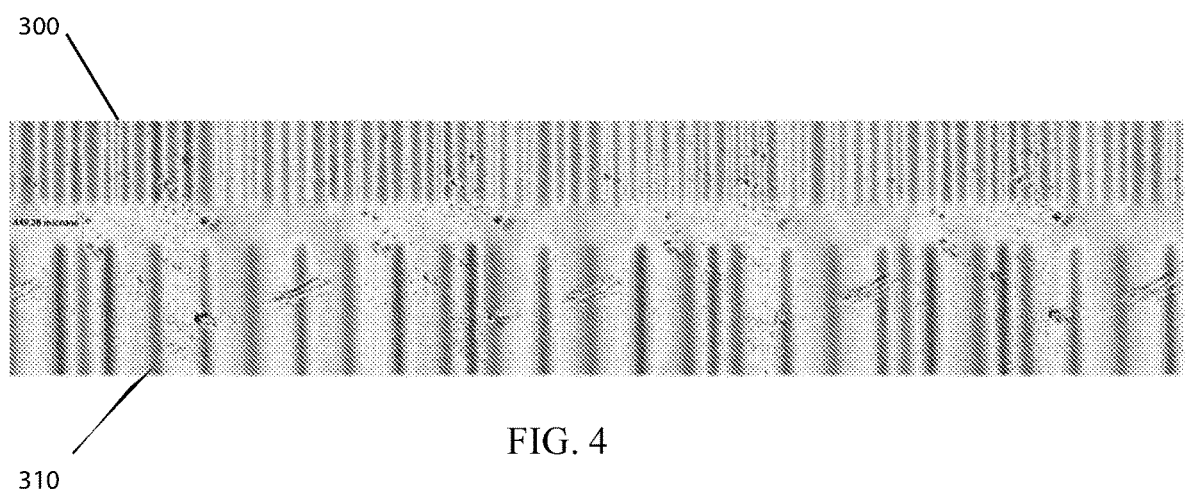
FIG. 4 shows a stitched image of a subsection of a magnetic stripe.

Counterfeit magnetic stripes can be detected by using a magneto-optical imaging (MOI) technique to directly observe and/or image the stray magnetic field encoded onto magnetic stripes. FIG. 4 shows a subset of stitched imaged of magnetic flux transitions generated through the MOI technique. The upper track (Track 1) 300 shows magnetic flux transitions at 210 bits per inch, and the lower track 310 (Track 2) shows magnetic flux transitions 75 bits per inch. The red (every other stripe starting with the left-most stripe in Track 2 310 and the second-left-most stripe in Track 1 300) stripes represent positive $B_z$, and the blue (every other stripe starting with the left-most stripe in Track 1 300 and the second-left-most stripe in Track 2 310) stripes represent the negative $B_z$. After development of images through the MOI technique, the images can be processed and measurements of the width of the flux transitions can be taken directly from the image and recorded.

Figure 5:
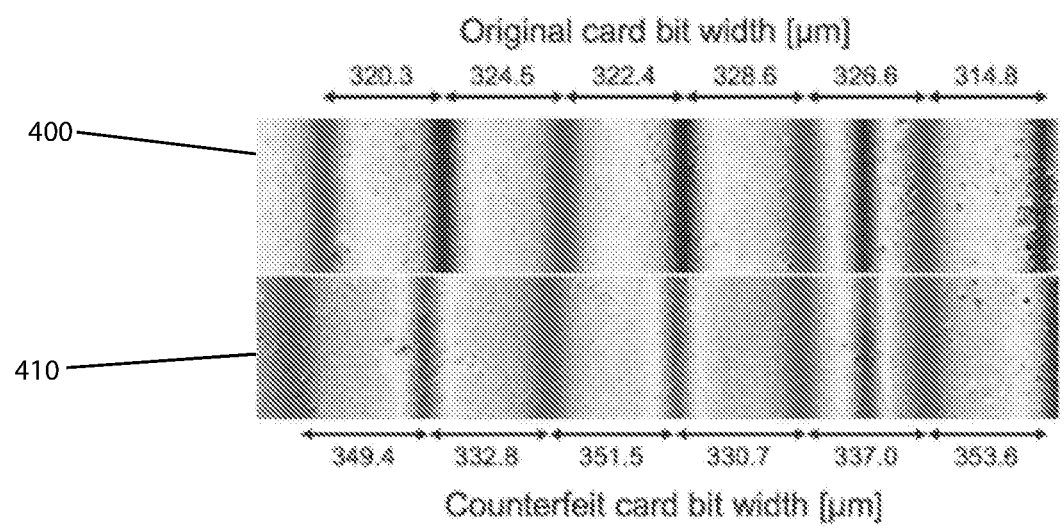
FIG. 5 shows an image of the comparison of clock flux transition distances between an original and its counterfeit copy.

FIG. 5 shows two images of the magnetic flux transitions and measured clock distance of an identical section of an original 400 and counterfeit 410 credit card. Visual inspection and measured distances verify that the distances between clock cycles vary with greater frequency in the counterfeit cards compared with the original cards.

Figure 6:
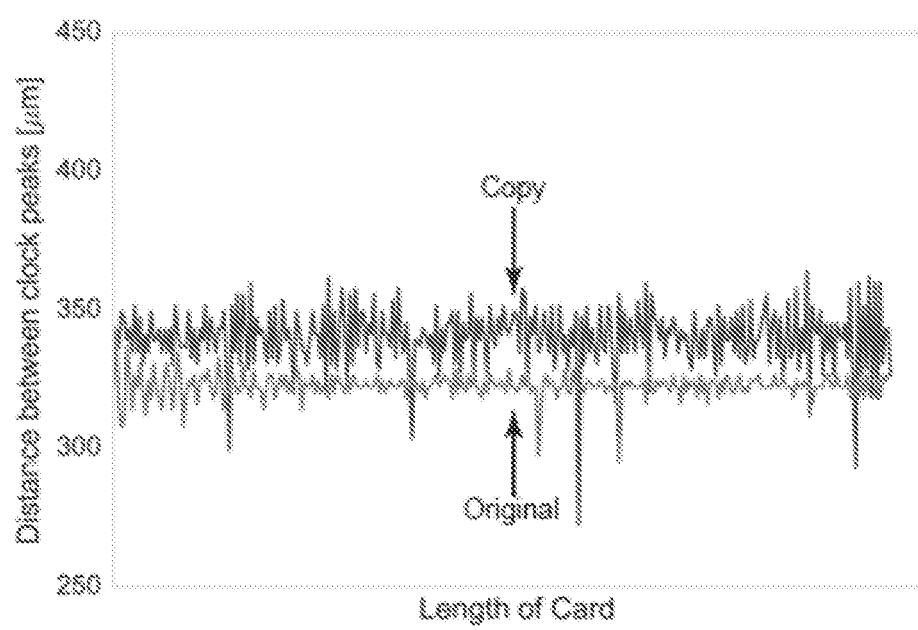
FIG. 6 shows a plot of the jitter over a length of a card for an original card (green, lower-most line) and its counterfeit copy (blue, upper-most line).

FIG. 6 shows a plot of distances between flux transitions across an entire original card and a counterfeit card. It is apparent from this graph that a distinctly larger variation of jitter exists across the counterfeit card than the original card.

Counterfeit magnetic stripes can also be detected by obtaining measurements directly through magnetic read head devices. As previously discussed, magnetic stripe cards are encoded with binary data through the F2F technique. When a magnetic stripe is swiped across a read head, the magnetic flux transitions create a voltage, in accordance with Faraday's law. A waveform with peaks denoting magnetic flux transitions can be generated by attaching the read head to an audio sink (e.g., a microphone input).

FIG. 6 is a plot illustrating the difference in physical distances between clocking flux transitions on an original credit card and its copy. The variation in physical distance between transitions is the jitter of each card. This plot demonstrates provides empirical data that an original card has less jitter than its corresponding copy.

Figure 7:
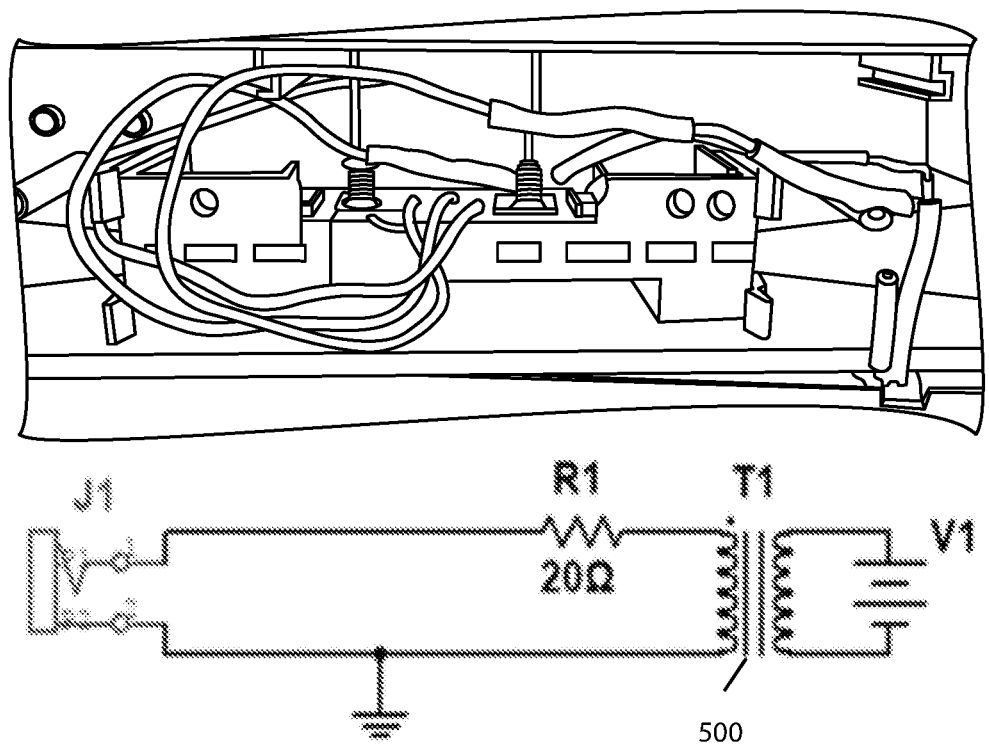
FIG. 7 shows an image of a modified card reader and its functionally equivalent electric circuit diagram.

FIG. 7 is an image of a read head device and its functionally equivalent circuit diagram with R1 representing resistance and V1 representing the voltage created by the magnetic flux transitions. The two parallel lines 500 represent a transformer core made from ferromagnetic material. After the analog waveform is read, it is processed and converted to a digital signal for processing. Measurements of the voltage peaks can be taken to determine the distances between magnetic flux transitions.

Figure 8:
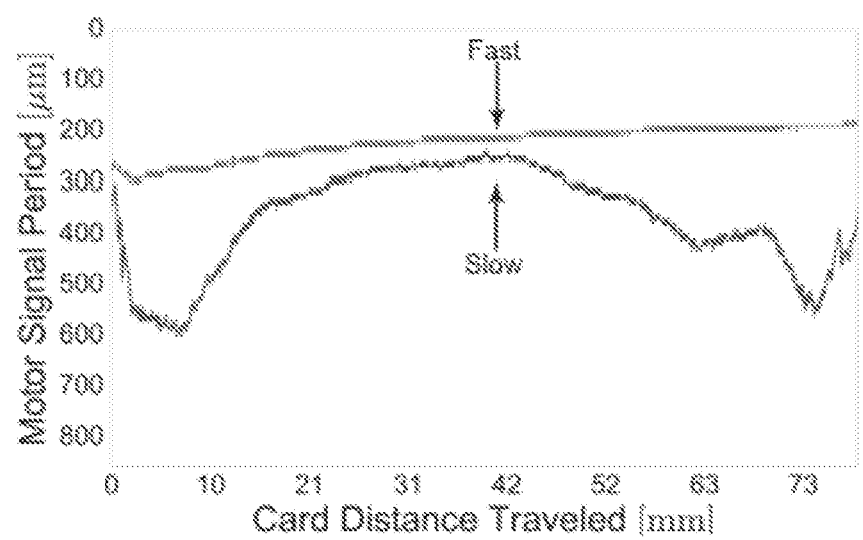
FIG. 8 shows a plot of motor signal period versus card distance traveled, demonstrating a comparison between swiping speeds.

FIG. 8 is a plot of the difference in the signals received from an encoder's rotary motor between a fast swipe of a card across a reader versus a slow swipe of the card. It is difficult to hand-swipe a card at a consistent, slow rate. This plot demonstrates that the linear response of the fast swipe verse the non-linear response of the slow swipe can be detected. It is disadvantageous, therefore, to adversaries to attempt to avoid detection by intentionally slowly swiping a card. Faster swipes provide more accurate, consistent results.

Figures 9, 10:
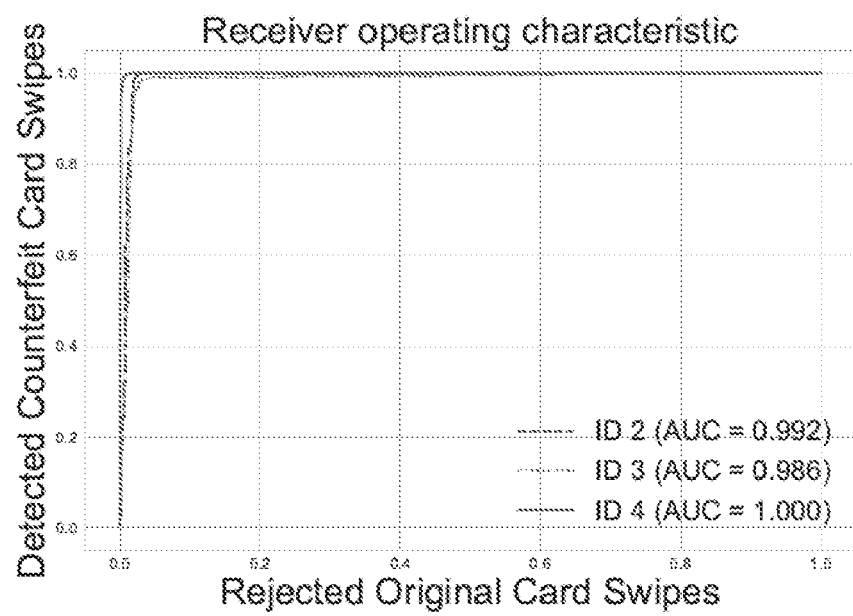
FIG. 9 is a table showing experimental results of low quality open card types and high quality cards open and closed card types.
FIG. 10 is a plot of a receiver operating characteristic (ROC) for high quality cards.

FIG. 9 is a table of the experimental results obtained when subjecting gift/stored value cards to the counterfeit detecting system.

FIG. 10 is an ROC curve for high-quality cards and shows that the strongest detection capability for all cards with only a single swipe.

Figure 11:
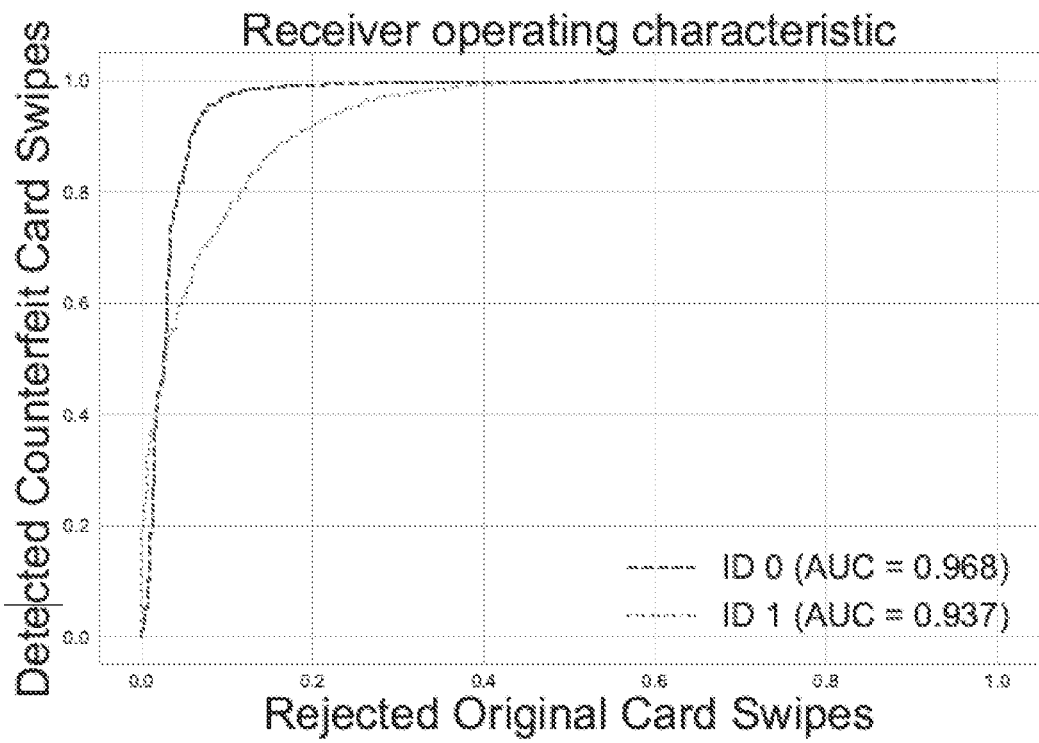
FIG. 11 is a plot of an ROC curve for low-quality cards.

FIG. 11 is an ROC curve for low-quality cards and shows good detection by the system even in non-optimal conditions.

Figure 12:
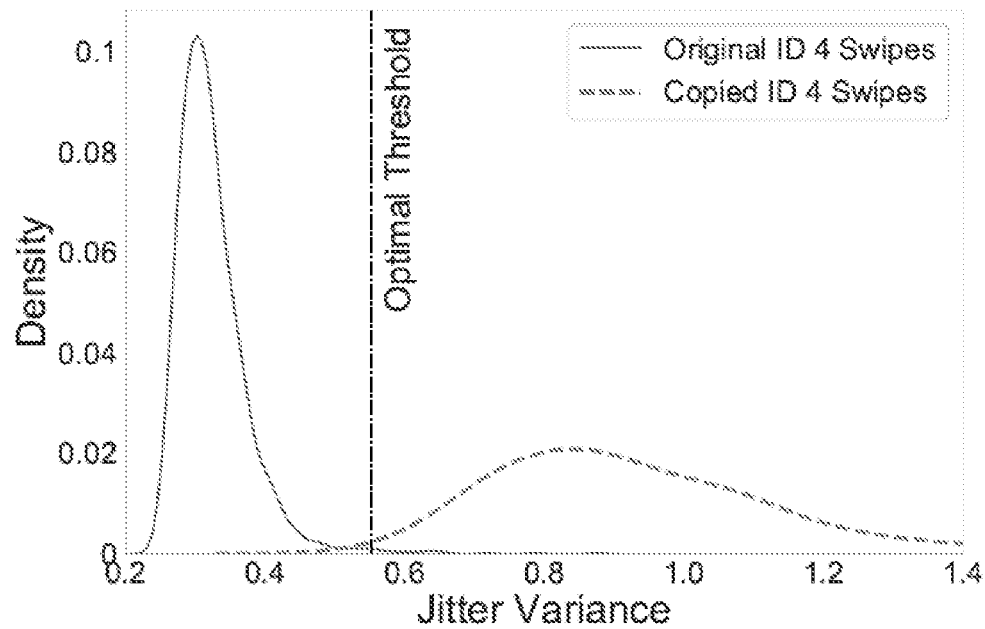
FIG. 12 is a plot of a kernel density estimate for all swipes ID 4 original and copied cards.

FIG. 12 shows a kernel density estimate for all swipes of ID 4 original and copied cards. This figure shows the large difference between measured jitter variance in these two sets.

Figure 13:
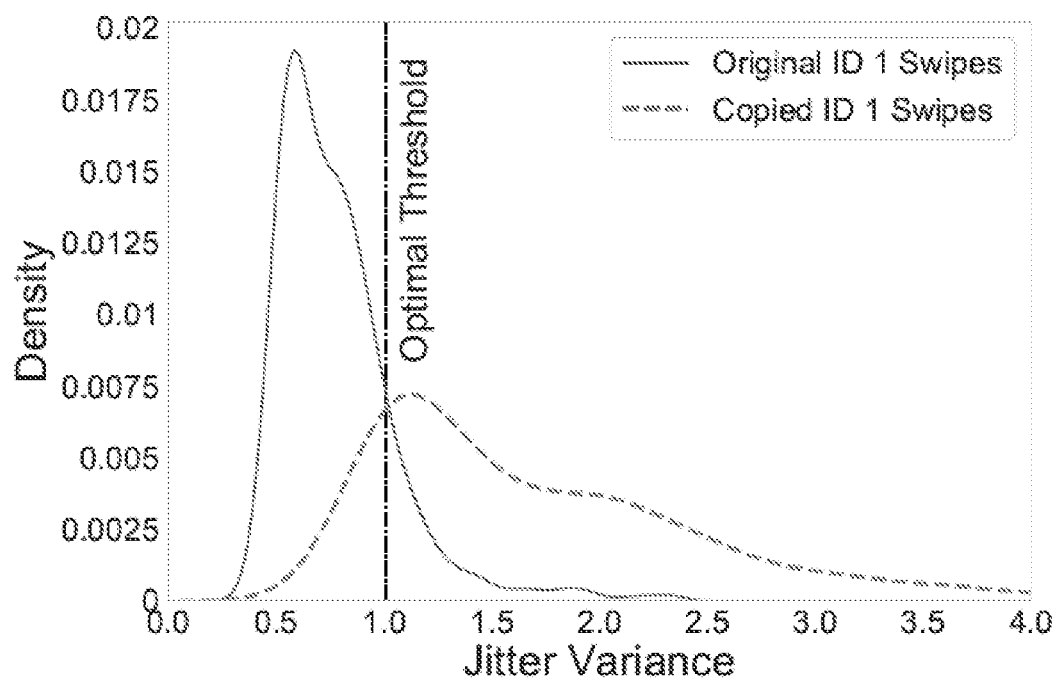
FIG. 13 is a plot of a kernel density estimate for all swipes of ID 1 original and copies cards.

FIG. 13 is a kernel density estimate for all swipes of ID 1 original and copied cards. The overlap between the two distributions is a result of low-quality manufacturing processes and materials.

Figure 14:
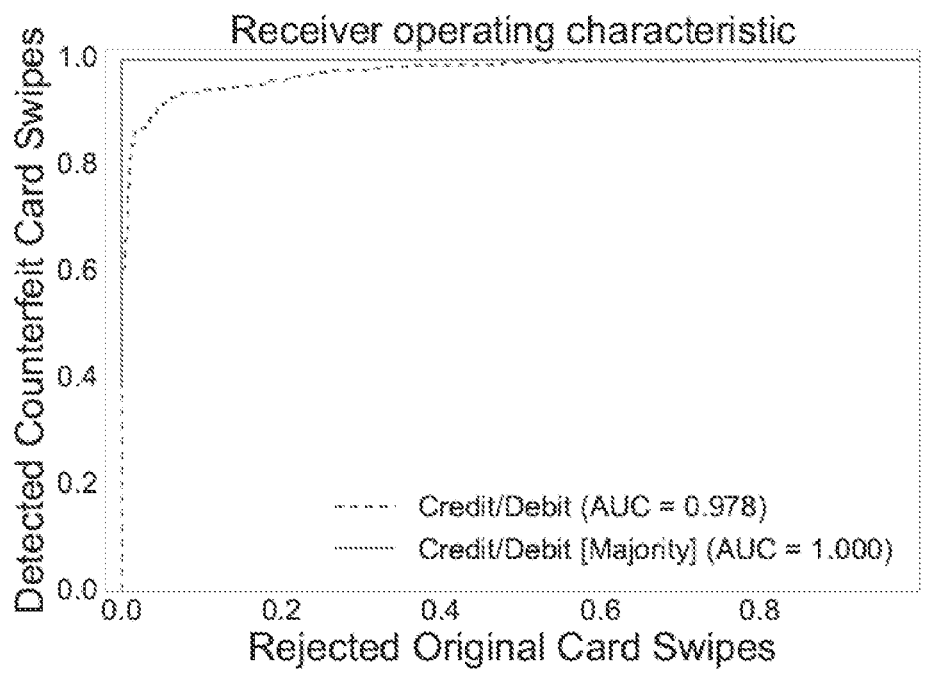
FIG. 14 is a plot of an ROC curve for all obtained credit and debit cards.

FIG. 14 is an ROC curve for obtained credit and debit cards. The curve is plotted twice, once by comparing all swipes and another with a simple majority voting scheme.

Figure 15:
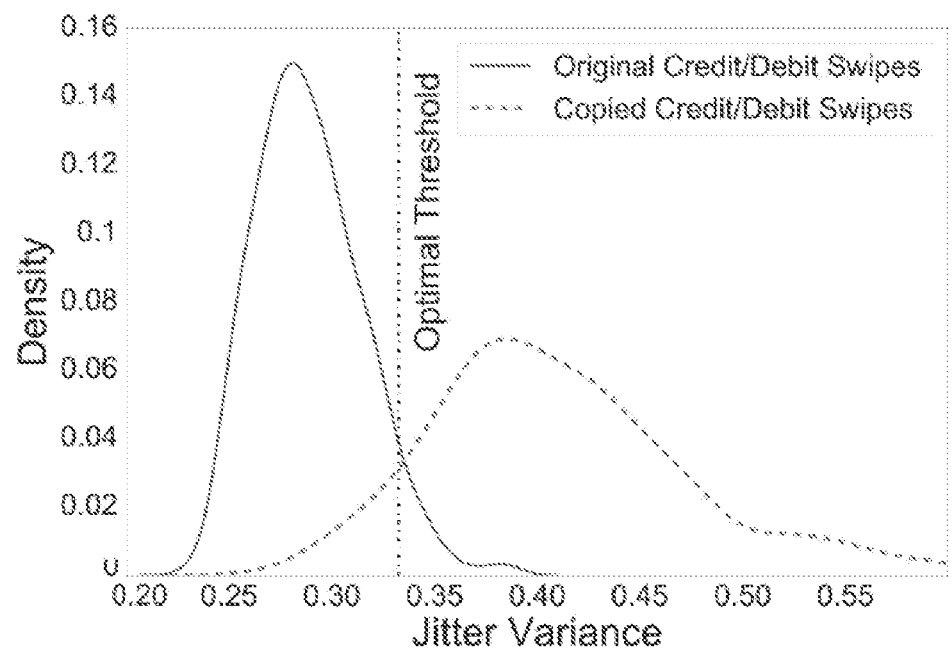
FIG. 15 is a plot of a kernel density estimate for all obtained credit/debit cards.

FIG. 15 is a kernel density estimate for all original credit/debit cards and their copies. FIG. 15 shows the large difference between measured jitter variance in these two sets.

Figure 18:
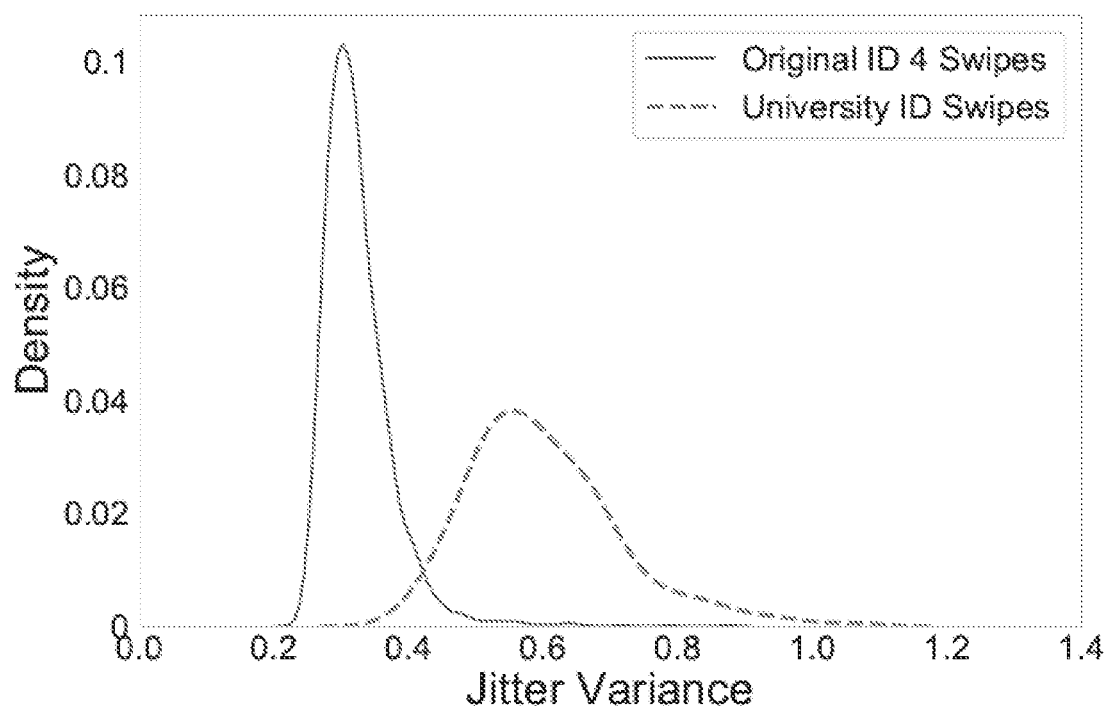
FIG. 18 is plot of a kernel density estimate comparing university ID cards produced by a HID Fargo DTC5500LMX device with gift card ID 4.

FIG. 18 is a kernel density estimate comparing university ID cards produced by the HID Fargo DTC5500LMX device with gift card ID 4. This device is two orders of magnitude more expensive than a Misiri-style encoders but also produces cards with high jitter.

Counterfeit magnetic stripes can be detected by determining how much a card's measured jitter varies from the mean to obtain a critical value ($V_J$) and comparing the $V_J$ of the subject card to that of a standard. First, the absolute locations ($p_0 \ldots p_m$) of the clocking peaks can be determined. These values can be stored into vector D containing the distance (in samples) between peaks:

$$D = \langle p_1 - p_0, \ldots p_m - p_{m-1} \rangle \quad (1)$$

Second, the distance of this vector, the measured jitter of the subject card, can be stored in J, a vector of length m−1:

$$J = \langle |D_1 - D_0| \ldots |D_{m-1} - D_{m-2}| \rangle \quad (2)$$

Third, the initial 10% of the values in J can be discarded, though this is not necessary. The values can be discarded to remove the influence of the initial acceleration of the card as it is swiped. This acceleration can exert influence and distort the results.

Fourth, the value of $V_J$ of J can be computed, where $\mu_J$ is the mean of J and |J| is the length of J:

$$V_J = \frac{\sum_{k=0}^{|J|-1}(J_k - \mu_J)^2}{|J|} \quad (3)$$

Then, the value of $V_J$ can be compared with a known or standard $V_J$. Higher values of $V_J$ indicate greater degree of fluctuation of jitter.

Figure 19:
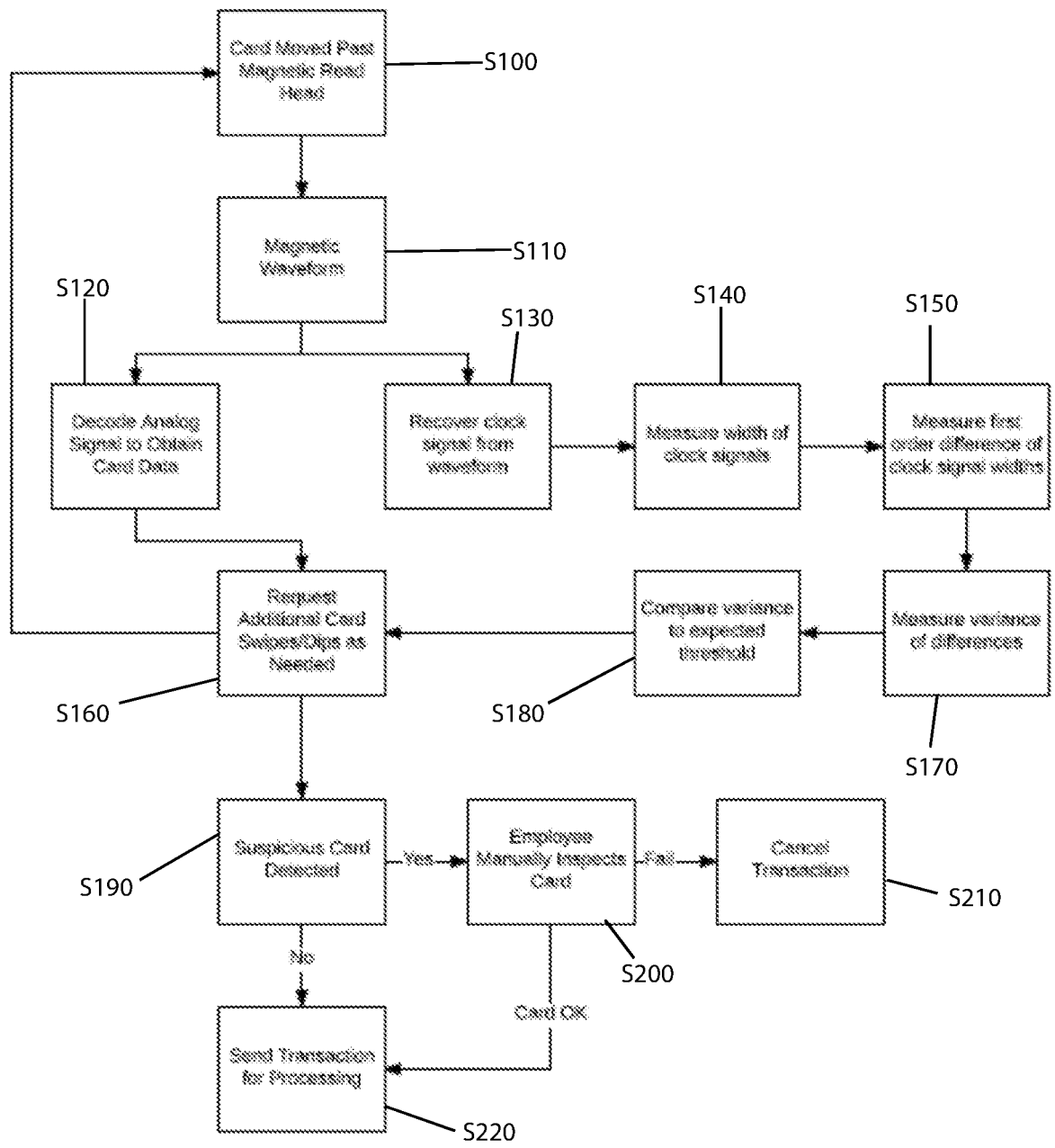
FIG. 19 is a flow chart of the steps of determining whether a magnetic stripe is counterfeit according to an embodiment of the subject invention.

In an embodiment, a method of determining whether a card is legitimate or a counterfeit can be as seen in FIG. 19. A system user can swipe or direct to be swiped the magnetic striped card across a magnetic read head S100. The magnetic read head detects the magnetic waveform encoded on the magnetic stripe S110. A computer, processor, computing device, or other machine capable of processing reads the magnetic encoding to either decode an analog signal to obtain card data S120 or recover the clock signal from the waveform S130. If the system user chooses to decode S120, a next step can be to request additional card swipes if needed S160. If the system user chooses to recover the clock signal S130 the next step can be to measure the width of the clock signals S140. This can be followed by measuring the first order difference of the clock signal widths S150. The variance of differences in clock width cycles can be then measured S170. This can be followed by comparing the variance to an expected threshold S180.

Additional swipes and/or dips can be requested as needed S160. At this point, if a suspicious card is detected S190 the employee can manually inspect the card S200. The transaction could be considered to fail and cancelled S210 if that is the policy or if the card does not appear legitimate, the transaction should fail. If the card appears legitimate (and the policy of the business is to only fail upon a suspicious visual inspection result) or a suspicious card was not initially detected, the transaction should be processed towards completion S220.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

A method for detecting a counterfeit magnetic stripe, the method comprising:
  providing an encoded magnetic stripe;
  placing the encoded magnetic stripe under a magneto-optical imaging device;
  imaging, by the magneto-optical imaging device, a magnetic stripe image of the encoded magnetic stripe; and
  providing a (non-transitory) machine-readable medium (e.g., a (non-transitory) computer-readable medium) connected to the magneto-optical imaging device (and comprising machine-executable instructions stored thereon, that when executed by a processor in operable communication with the machine-readable medium, performs the following:
    receive the magnetic strip image;
    process the magnetic stripe image to recover each clocking flux transition along the encoded magnetic stripe;
    identify each location of the clocking flux transitions along the encoded magnetic stripe;
    measure a distance between each successive clocking flux transition;
    calculate a variance of the measured distances between each of the successive the clocking flux transitions;
    determine a critical value ($V_J$) based on the mean of the measured distances of the clocking flux transitions;
    compare the critical value $V_J$ of the encoded magnetic stripe to a standardized value for $V_J$; and
    determine whether the encoded magnetic stripe is counterfeit based on the compared critical value $V_J$ of the encoded magnetic strip and the standardized value for $V_J$.

Embodiment 2

The method of embodiment 1, wherein the magnetic strip is encoded with frequency/double frequency (F2F) technique or other Differential Manchester encoding technique.

Embodiment 3

The method according to any of embodiments 1-2, wherein the magneto-optical imaging device is a magneto-optical microscope using a bismuth substituted yttrium iron garnet growth over a gadolinium gallium substrate, covered by an aluminum reflective layer, and a sapphire protection layer as a magneto-optical indicator film.

Embodiment 4

The method according to any of embodiments 1-3, wherein a first 10% of the distances between clocking flux transitions are discarded and not used in determining $V_J$, and wherein the first 10% refers to the initial 10% of a spatial distance along the encoded magnetic stripe.

Embodiment 5

The method according to any of embodiments 1-4, wherein, if the $V_J$ of the magnetic stripe differs from the standardized value for $V_J$ by more than a predetermined threshold value, the magnetic stripe is determined to be counterfeit.

Embodiment 6

The method according to any of embodiments 1-5, wherein the processor is further configured to insert the absolute locations of each clocking flux transition in a vector D as follows:

$$D = \langle p_1 - p_0, \ldots p_m - p_{m-1} \rangle$$

wherein $p_k$ is a location of clocking flux transition.

Embodiment 7

The method of embodiment 6, wherein the processor is further configured to take a distance of vector D and store the distance in vector J as follows:

$$J = \langle |D_1 - D_0| \ldots |D_{m-1} - D_{m-2}| \rangle.$$

Embodiment 8

The method of embodiment 7, wherein determining the $V_J$ of the magnetic stripe comprises using the following formula:

$$V_J = \frac{\sum_{k=0}^{|J|-1}(J_k - \mu_J)^2}{|J|},$$

wherein, $\mu_J$ is the mean of J, and $|J|$ is the length of J.

Embodiment 9

The method of embodiment 8, wherein the measurement of distances is only the distances between full-clock transitions and any measured distances between half-clock transitions are discarded.

Embodiment 10

A method for detecting a counterfeit magnetic stripe, the comprising:
provinding an encoded magnetic stripe;
swiping the encoded magnetic stripe through a card reader to generate an analog waveform,
wherein the card reader is connected to an audio sink; and providing a (non-transitory) machine-readable medium (e.g., a (non-transitory) computer-readable medium) connected to the card reader (and/or to the audio sink) (and comprising machine-executable instructions stored thereon, that when executed by a processor in operable communication with the machine-readable medium, perform the following:
process the analog waveform to a binary waveform;
measure a distance between clocking flux transitions of the binary waveform;
determine a variance of the measured distances between the clocking flux transitions;
determine a critical value ($V_J$) based on a mean of the measured distances between the clocking flux transitions; and
determine whether the encoded magnetic stripe is counterfeit based upon the critical value.

Embodiment 11

The method according to embodiment 11, wherein the first 10% of the distances between clocking transitions are discarded and not used in determining $V_J$, and wherein the first 10% refers to the initial 10% of a spatial distance along the encoded magnetic stripe.

Embodiment 12

The method of embodiment 11, wherein, if the $V_J$ of the magnetic stripe differs from the standardized value for $V_J$ by more than a predetermined threshold value, the magnetic stripe is determined to be counterfeit.

Embodiment 13

The method according to any of embodiments 11-12, wherein the processor is further configured to insert the absolute locations of each clocking flux transition in a vector D as follows:

$$D = \langle p_1 - p_0, \ldots p_m - p_{m-1} \rangle$$

wherein $p_k$ is a location of clocking flux transition.

Embodiment 14

The method of embodiment 13, wherein the processor is further configured to take a distance of vector D and store the distance in vector J as follows:

$$J = \langle |D_1 - D_0| \ldots |D_{m-1} - D_{m-2}| \rangle.$$

Embodiment 15

The method of embodiment 14, wherein determining the $V_J$ of the magnetic stripe comprises using the following formula:

$$V_J = \frac{\sum_{k=0}^{|J|-1}(J_k - \mu_J)^2}{|J|},$$

wherein, $\mu_J$ is the mean of J, and $|J|$ is the length of J.

Embodiment 16

The method according to any of embodiments 10-15, wherein the measurement of distances is only the distances between full-clock transitions.

Embodiment 17

A counterfeit card detecting apparatus, comprising:
a card reader connected to an audio sink;
an audio sink connected to the card reader to generate an analog waveform; and a (non-transitory) machine-readable medium (e.g., a (non-transitory) computer-readable medium) connected to the card reader (and/or to the audio sink) and comprising machine-executable instructions stored thereon, that when executed by a processor in operable communication with the machine-readable medium, performs the following:
   detect an analog waveform across the length of the encoded magnetic stripe;
   detect a plurality of peaks of the analog wave form;
   measure a distance between each successive pair of peaks of the analog waveform;
   calculate a variance of the measured distances between each of the successive the clocking flux transitions;
   determine a critical value ($V_J$) based on the mean of the measured distances of the clocking flux transitions;
   compare the critical value $V_J$ of the encoded magnetic stripe to a standardized value for $V_J$; and
   determine whether the encoded magnetic stripe is counterfeit based on the compared critical value $V_J$ of the encoded magnetic strip and the standardized value for $V_J$.

Embodiment 18

The apparatus of embodiment 17, wherein the processor is further configured to the only measure distances between full-clock transitions and any measured distances between half-clock transitions are discarded.

Embodiment 19

The apparatus of embodiment 18, wherein the processor is further configured to:
   discard the first 10% of the spatially located distances between clocking flux transitions prior to determining $V_J$,
   wherein the first 10% refers to the initial 10% of a spatial distance along the encoded magnetic stripe.

Embodiment 20

The apparatus of embodiment 19, wherein the processor is further configured to determine the encoded magnetic stripe is counterfeit if the $V_J$ of the magnetic stripe differs from the standardized value for $V_J$ by more than a predetermined threshold value.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1—Confirmation of Phenomenon

Magneto-Optical Microscope
   Magneto-optical imaging (MOI) techniques can be used to detect stray magnetic fields encoded on magnetic stripe cards. A high-resolution magneto-optical microscope that adapted the MOI technique onto a conventional metallurgical microscope was utilized for measuring and quantifying the encoded data present on the magnetic stripe. The system enabled measurement of stray fields with 6 μm spatial resolution over a 2.7 mm×2.1 mm field of view.
   The microscope operates with a magneto-optical indicator film (MOIF). This enables the microscope to measure the encoded magnetic field in the z-direction, in accordance with the Faraday effect. The Faraday effect is an optical phenomenon wherein a rotation of the plane of polarization in a light wave, caused by the interaction between light and the MOIF, is proportional to the external magnetic field. Proper calibration and validation yields a quantification mechanism of the z component of the magnetic flux density ($B_z$) in units of Teslas. The MOIF can be a bismuth substituted yttrium iron garnet growth over a gadolinium gallium substrate (transparent and with no contribution to the Faraday rotation) and can be covered by an aluminum reflective layer and a sapphire protection layer. Two calibrated types of MOIF can be used with a 5× magnification microscope: 1) 45 mT magnetic field range with +0.5 mT field resolution and +6.2 μm spatial resolution, and 2) ±230 mT magnetic field range with ±1 mT field resolution and 20.1 μm spatial resolution.
   Cards can be loaded on the microscope stage and secured to prevent movement and ensure a planar surface. In order to generate a complete image of a stripe across a card, multiple images of 2660 μm×2128 μm were taken and stitched together. FIG. 4 shows such an image generated from the microscope. The positive and negative peaks correspond with the magnetic bit transitions, as shown in FIG. 1. Because this technique directly images the magnetization (stored bits), it provides a reliable and accurate technique to measure the distance between those transitions (to within 6 μm accuracy). By comparing images of an original card with its copy, it is possible to measure dimensional variations that arise in the magnetic stripe writing mechanism of the card encoder.

Encoder
   A Misiri MSR705 card encoder was purchased to fabricate a counterfeit card. To read the speed of the card as it passes over the write head, the encoder has a small rotary encoder attached to a wheel in the track. As the card passes through the track, the wheel turns, causing the motor to output a continuous sinusoid wave. Increased frequency in the waveform corresponds to faster speeds. The resolution of this motor was measured at 50 μm.
   The encoder was chosen because it is inexpensive, readily available, and similar to encoders used in card cloning instructional videos. Once the source card is swiped, the data appears on-screen and copy can be created. The destination card is verified to ensure the data on the card is correct. The encoder does not make a perfect copy of the original analog encoding; it simply reads the binary data on the source card and writes a new analog track onto the destination card. As a result, the jitter present on the destination card is not related to any jitter present on the original. Instead, it is the result of the mechanical limitations of the encoder wheel.
   An original credit card and a copy of that card created with the encoder were both examined. 43 images of each card were captured using a ±230 mT MOIF, with each picture slightly overlapping to capture the entirety of the cards' second tracks. FIG. 4 shows one of the captured images. Each pixel in the image is exactly 2:08 µm. These images show "ground truth" measurements.

Next, the clocking flux transitions were recovered. The image processing code averages adjacent pixels in the image to reduce the ability for imperfections in the MOIF to influence the results. The output of this process can be described as a waveform, with the most intense regions in the image as peaks in the waveform.

The remainder of the process is identical to reading a card. The locations of the flux transitions were identified using the peaks of the waveform, the distance between the peaks was measured, and whether each transition is on the clock or the half-clock was determined. After discarding any half-clock transitions, the remaining data contains only those transitions which represent the clock.

FIG. 5 shows images from an original card and its corresponding clone. These images are of the same section of data and show the measured distances between each of the clock transitions. While some of the distances between transitions may appear the same, a difference of only 5 pixels is 10:4 µm in the image.

The plot in FIG. 6 shows these same clock transition distances of FIG. 5 over the entirety of both cards. The copied card has highly-variable distances compared to the original, and so the copied card has a higher amount of jitter. Accordingly, this shows that variances in jitter can be used to distinguish original cards and copies.

Example 2—Observation on Commodity Equipment

Audio Recording

An inexpensive magnetic stripe reader was purchased and some existing electronic components were removed. The read head and a resister were connected to 3.5 mm audio jack. FIG. 7 shows a functionally equivalent circuit diagram to the modified magnetic stripe reader seen above the circuit diagram. The circuit is functionally identical to smartphone magnetic stripe readers and the longer 17:5 cm track provides more consistent swipes.

The analog signal from the reader must then be converted to a digital signal. Most consumer-grade audio analog-to-digital (ADC) hardware (e.g., those found in laptops and smartphones) supports audio capture at a maximum sampling rate at 44:1 kHz or 48 kHz. Initial testing found that these rates are insufficient for accurately detecting jitter. Higher-resolution equipment is able to more accurately measure jitter on a wider variety of swipe speeds. Therefore, a higher-resolution audio capture device (i.e., Sound Blaster Audigy 2 NX) that supported a 96 kHz sampling rate was used. The reader was connected to the microphone input on the device, and the audio hardware was connected via USB to a laptop running Ubuntu Linux. Audio recording software then captured the microphone input while a card was swiped.

The analog waveform was decoded from F2F to binary, and the binary was decoded to plaintext. The system also verified the card's checksums and discarded any swipes that were not read correctly. The system then measured the number of samples between each clocking transition and outputs a vector of distance (in samples).

Speed Variance

To determine if the use of commodity reading equipment introduced several additional factors which might create error in the results (for example, the average swipe speed, acceleration, magnetic field strength, and curvature of the card material) the following experiment was conducted.

Large inconsistencies in the speed of the card as it moves across the read head can induce jitter in the audio waveform. This artifact is intuitive; as the flux transitions pass the read head slower or faster, the distance between them in the resulting waveform respectively increases or decreases. Therefore, swipes should be captured at a consistent speed.

To demonstrate how swipe speeds might affect the accurate recovery of jitter the speed sensor motor in the card encoder was connected to an oscilloscope. This motor generated a constant sinusoid wave which compresses the periods as the speed of the card increases. A single card was swiped both fast and slow while attempting to maintain a constant speed in the track for both fast and slow swipes. FIG. 8 shows the differences in speed as well as the difficulty in moving a card both consistently and slowly. The fast swipe, though it continues accelerating in the track, provides a relatively consistent speed when compared to the slow swipe.

To confirm the variance in clock-symbol placement is detectable with commodity hardware system, an original credit card and a copy of that card were swiped. Afterwards, the output from both the original credit card and copy were compared. The original card generated a smoother curve, indicating that it has less jitter than the copy. The measured $V_J$ for the original card was 0.531 and the copy was 0.709, also showing the expected difference for both cards. Therefore, $V_J$ can be measured with commodity hardware.

Example 3

Gift and Stored Value Cards

To test the effectiveness of the system the following experiment was conducted. Walmart agreed to assist and provided 5 types of open-(e.g., Visa) and closed-loop (same retailer only) cards consisting of 650 individual cards. Each card was cloned and swiped/recorded at least 10 times and any unreadable swipes were discarded. In total, 12,919 audio waveforms were obtained for analysis. FIG. 9 shows the breakdown of each type of card.

The obtained cards were manufactured in a wide range of qualities. The reloadable cards are made from a typical glossy card stock and stripe material, whereas the non-reloadable cards were matte and made from a much softer grade of plastic. It was noted that after swiping the non-reloadable cards that the swiping process had slightly shaved down the plastic. The lower quality of these cards underscored that they are intended for a single use. These cards often had low-coercivity stripes, which are more sensitive to magnetization. As a result, these stripes were often noisy, easily damaged, and produced non-ideal waveforms (i.e., rounder peaks). This made accurate measurement of VJ more difficult by reducing the amplitude of peaks and therefore making peak detection more difficult. The applicable ISO/IEC standards state that in high-sensitivity systems, the magnetic characteristics of high- and low-coercivity cards cause higher peak amplitude on high-coercivity cards than low. These cards have visible characteristics of being low-coercivity quality.

The effectiveness of the detector by card ID was also examined. As opposed to credit and debit cards, where all merchants accept any card in a payment network, many of gift and stored value cards are intended for use at a specific merchant. Since the merchant is both issuing and accepting the cards, it may wish to set more specific detection thresholds or policies by card.

High Quality. FIG. 10 shows the receiver operating characteristic (ROC) curve for detection of each of the high-quality cards. Using only one swipe, the detector was able to distinguish cards with accuracy ranging from 96.9% to 99.9%. FIG. 12 shows a kernel density estimate for all swipes for ID 4 using the ROC's computed optimal threshold. Generally, FIG. 12 shows that the detector was able to distinguish these cards with extremely high accuracy.

Low Quality. As expected, the obtained non-reloadable, lower-quality cards performed worse. FIG. 11 shows the ROC curve for detection of each of low-quality cards. While accuracy was not as strong as the high-quality cards, the detector reached a minimum accuracy of 93.7%. Card ID 1 had the lowest performance with a TPR/FPR of 85.8%/14.2%. Although these results may seem low, in practice such a system is most likely to be used as a heuristic to trigger manual inspection. The outcome of a detection (or negative detection) is strictly a merchant policy issue; detection from the described system does not imply that a transaction is rejected.

To demonstrate that the number of cards used in the experiments provided a statistically significant result, a two group (original, copy) independent means difference t-test was performed. This test was a null hypothesis test, where the null hypothesis was that the two means are equal. The null hypothesis stated that there is no statistical difference between the jitter measured on original cards and copies. This test was performed twice: once for the sets of all copies and all originals (i.e., in order to distinguish any original from any copy) and again for the set of copies and originals for card ID 4 (i.e., in order to distinguish a copy of card ID 4 from an original).

All cards. The calculated Cohen d-value of the sets of all original and all copies was 1.192 and had an r-effect size of 0.51, indicating a very large effect size. The p-value was <0:0001 with power of 1.0, which indicated an extremely high likelihood that there was a statistical difference between original gift cards and copies. Accordingly, the null hypothesis was rejected that the results are statistically significant were confirmed.

ID 4. The calculated Cohen d-value of the sets of original and copies for ID 4 was 2.385 and had an r-effect size of 0.77, indicating a huge effect size. The p-value was <0:0001 with power of 1.0, which indicated an extremely high likelihood that there was a statistical difference between the originals and copies. Accordingly, the null hypothesis was rejected confirming that these results remained statistically significant.

Credit and Debit Cards

An analysis was performed on credit and debit cards. University faculty and students provided credit cards and debit cards having one of the four major payment network logos (Visa, MasterCard, American Express, and Discover) to swipe and measure. An institutional review board (IRB), was contact and indicated that because the subject of the experiment was magnetic encodings and not people themselves, no further IRB review or approval was necessary. In total, 55 credit and debit cards were accessed from a variety of issuers.

Each of the cards was cloned with an encoder, then swiped using the described detector 10 times each. For each swipe, the described system recorded the duration of the swipe and the distance (both in number of samples) between each clocking flux transition. Each card was manually inspected for physical defects and extreme wear (e.g., cracks). All sensitive data was securely deleted and the copies were physically destroyed (in the presence of the cards' owners) to protect the security of the payment cards. The machine used to capture this information was not connected to a network during the experiments.

FIG. 14 shows the receiver operating characteristic (ROC) curve for both the original and cloned credit and debit cards. FIG. 15 shows a kernel density estimate for all swipes from the above experiment along with the computed optimal threshold using the ROC. Generally, FIGS. 14 and 15 shows that the swipes demonstrated a significant difference between jitter in original and copied cards.

To reduce outliers caused by swipes with highly variable speeds, each card was re-analyzed using an n-majority voting system. In this system, the optimal threshold determined was fixed in the generation of the ROC curve (where TPR-FPR is minimized). All combinations of n swipes were examined and that the detector alerts when $$> \frac{n}{2}$$

swipes are above the threshold was considered. With n=3, a TPR of 100% and a FPR of 0% is achieved. In dip-style readers, such as those typically found at gas pumps and some ATMs, the act of dipping the card produces two swipes, so in some cases no additional swipes may be needed.

To demonstrate that the number of cards obtained in this experiment provided a statistically significant result, a two group (original, copy) independent means difference t-test was performed. This test was a null hypothesis test, where the null hypothesis was that the two means are equal. The null hypothesis stated that there is no statistical difference between the jitter measured on original cards and copies. The calculated Cohen d-value from the individual swipe sets was 2.287 and had an r-effect size of 0.75, indicating a very large effect size. The p-value was <0:0001 with power of 1.0, which indicated an extremely high likelihood that there was a statistical difference between original credit/debit cards and copies. Accordingly, the null hypothesis was rejected and that the results were statistically significant was confirmed.

Mechanical Swiping

One obvious evasion tactic by adversaries is to develop or acquire an automatic encoding machine to remove jitter induced by hand-swiping cards. Attaining the required micron-scale precision, however, is much more difficult than a simple, do-it-yourself motorized card track. The equipment must move the card at a precise, constant rate. While unable to prove a negative (i.e., that there exists no commercial encoder capable of producing low-jitter cards), two publicly-available motorized magnetic stripe devices are examined below.

Figure 16:
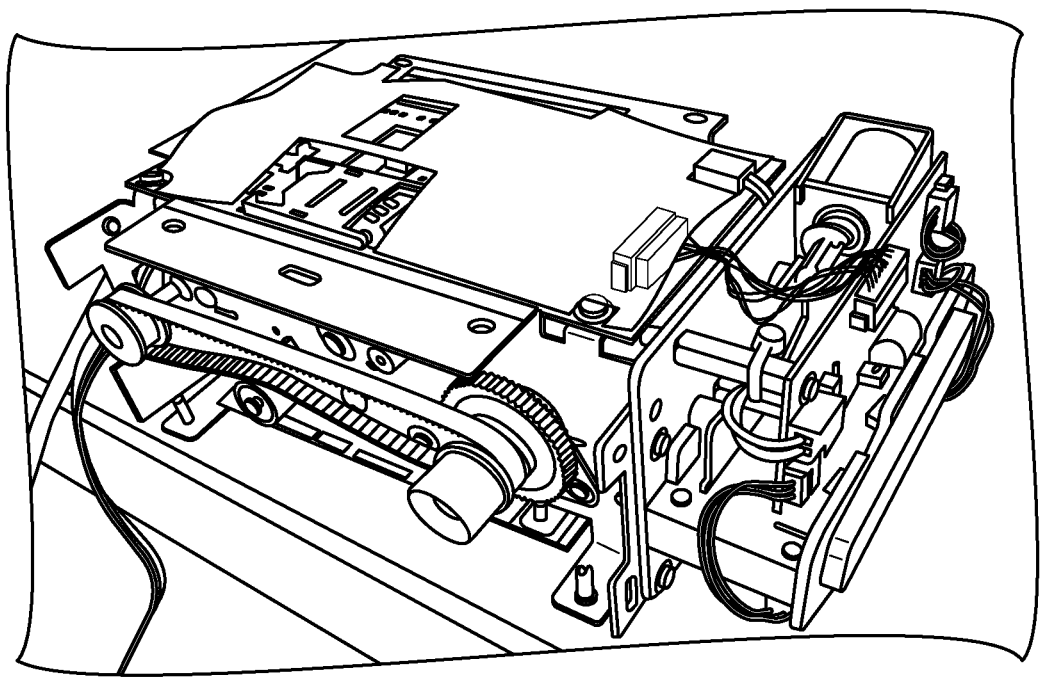
FIG. 16 is an image of a ZCS150 motorized device.

A ZCS Technology ZCS150 was purchased, as shown in FIG. 16, online. This device is designed to be used in ATM-style terminals and pulls the card over the magnetic head with a motor as the card enters or exits the device. Although this inexpensive device is not capable of encoding magnetic stripe cards, an initial attempt was made to modify it to directly to do so. The hardware contained security features to prevent modification, and the attempts to augment the capabilities of this device were unsuccessful. An attacker trying to repurpose this device would face similar difficulty. However, this device does not need to be converted into an encoder to determine whether or not it could produce more consistent cards if the attacker could evade the security features. Instead, because the ZCS150 does not contain the control system to precisely detect card position and simply interacts with the card assuming consistent movement rate within the ISO specified range, the acceleration of a card in the ZCS150 can be measured whether it is substantially less variable than doing so by hand can be determined.

An accelerometer was attached to a card, then the device was allowed to draw in the card 10 times. For comparison, the same accelerometer was attached to a wristband and hand swiped a card 10 times. Cards read by the ZCS150 exhibited an average acceleration of −50 mm/s$^2$ whereas those done by hand were ~30 mm/s$^2$. This means that contact with magnetic stripe cards was consistent (i.e., the speed varied little in each case), making hand-swiping nearly identical (and, in fact, slightly more consistent) to adding a simple motor to the encoding process. The additional variation in the ZCS150 can possibly be attributed to sources of friction within the unit (e.g., a ledge that pushes that card against the read head). Accordingly, there is no obvious reduction in jitter simply by adding a small motor and an adversary would not be able to avoid our detection via this simple strategy.

Figure 17:
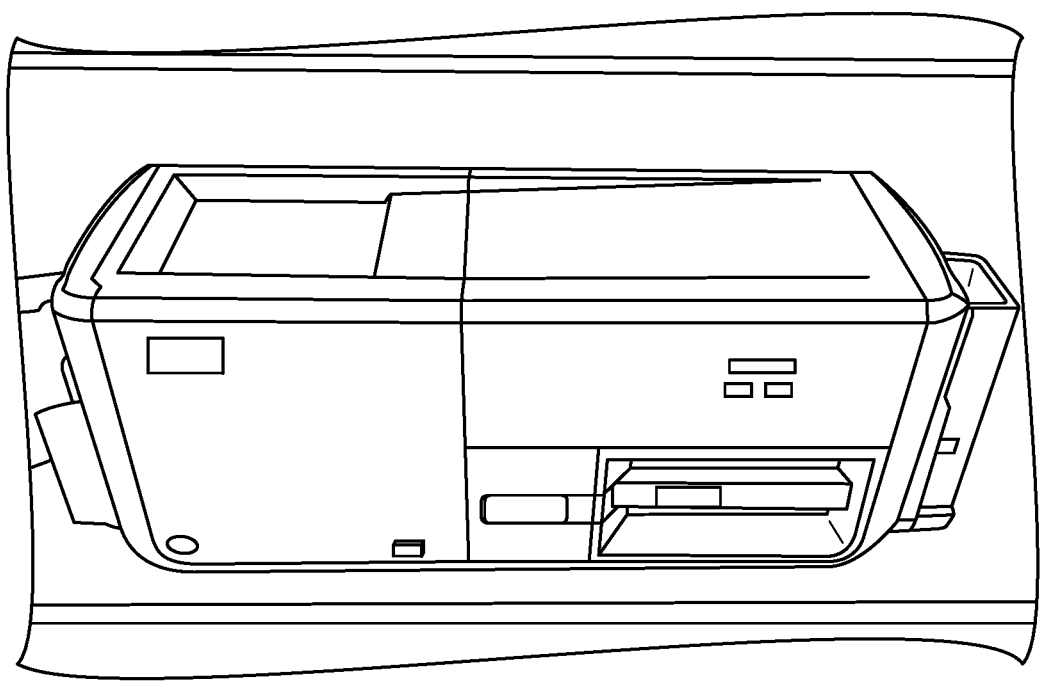
FIG. 17 is an image of an HID Fargo DTC5500LMX device.

An HID Fargo DTC5500LMX, as shown in FIG. 17, is used in colleges to automatically print, laminate, and encode student and faculty ID cards. An attacker with such a device could produce realistic-looking gift card clones complete with a branded face. While unable to produce arbitrary cards with this device, the VJ values of two cards produced by this device were examined. Here, the cards produced by the Fargo device were considered to be counterfeits by assuming the attacker has control of this device.

FIG. 18 shows the distribution of 150 swipes each of two university ID cards as it compared with gift card ID 4. Despite this device being nearly two orders of magnitude more expensive than a Misiri-style encoder, it also produces cards with high jitter compared to the gift cards.

Example 4

Manufacturers realize that gift cards are typically used a few times then discarded. As a result, gift cards are not required to be produced as robustly as credit or debit cards. As explained earlier the magnetic stripes of gift cards can be classified as having a lower coercivity than credit or debit cards. An analysis was performed to determine whether the manufacturers' decisions for gift cards affected the reliability of the detection system.

Initially, 94 cards from 31 different brands were obtained for experimentation. 24 of the cards were open-loop gift cards and the remainders were closed-loop gift cards. Open loop cards can be characterized as cards in which the holder can make purchases generally anywhere a credit or debit card is accepted. Closed loop cards can be characterized as cards in which the holder can make purchases at a single company. For this experiments gifts cards included other cards, such as reloadable copier cards and rewards cards. These were considered gift cards as they contain encoded data on magnetic stripes manufactured for a single merchant.

In order to test the detection system in real world conditions, gift cards that had been previously exposed to realistic conditions were pursued. The magnetic stripe of each gift card was scanned to ensure the cards were readable and that it matches the information printed on the card. Cards that did not read properly were further examined under a Matesy minimo 4 device equipped with a Type A (±2:5 mT) MOIF. This device provided qualitative measurements of the magnetic field across the magnetic stripe. The device was used to rule out the possibility that the inability to read is due to the detection system rather than a result of weak or damaged magnetic stripes. This process resulted in 16 unreadable cards being removed from the set.

First, the detection system was administered to closed loop cards determine the reliability of the results. The experimentation steps were the same as with credit and debit cards. Each card was read and then copied by the encoder. Both the original and counterfeit gift cards were swiped 10 times. The system recorded the duration of each swipe and the distance (both in number of samples) between each clocking flux transition.

The resulting values for original and counterfeit cards were remarkably different than credit or debit cards. Correct detection for arbitrary individual swipes was 65.3% true positive rate (TPR) with a 34.67% false positive rate (FPR). A majority voting scheme coupled with the optimal threshold calculated over 3 swipes increased TPR slightly to 68.4% and reduced FPR to 32.6%.

To further understand this behavior, the same two-group (original, copy) independent means difference t-test as with credit and debit cards was used. In the instant case, the null hypothesis was that there is no statistical difference between measured jitter on the original and counterfeit cards. The calculated Cohen's d-value was 0.316 from the individual swipe sets and the r-effect size was 0.16. Although the effect size is smaller than that for credit or debit cards, the calculated p-value was 0.05 with a power of 0.999. Accordingly, the null hypothesis was rejected and a high probability of a distinct statistical difference exists between the original closed-loop gift cards and counterfeit cards.

The following step compared the $V_J$ values of the original and counterfeit closed-loop gift cards. The earlier experimentation suggested that the $V_J$ values of counterfeit cards should exceed the original card, however 24 (25%) of the counterfeit cards had decreased variance from the original cards. Through further experimentation, it was discovered that these 24 cards produced smoother curves along when analog waveform is recorded. The detection system relies upon sharper peaks for accurate measurement of the clock flux transitions and smoother curves induce error.

Credit and debit cards are fabricated with higher-coercivity stripes, which are more resilient and resistant to changes in the magnetic field. As gift card are manufactured with lower-coercivity stripes, the cards are more susceptible to damage and noise. Variations in performance occur within lower-coercivity stripes depending upon manufacturing decisions.

FIG. 11 presents two Chipotle® gift cards, each with lower-coercivity stripes. The circled portions highlight the noise contained in the brown stripe. This additional noise manifests itself into smoother curves in the analog waveform and thus inhibiting the reliability of the results. FIG. 12 presents the ROC for different stripe colors. The influence of the coercivity of the magnetic strips on the reliability of the results becomes apparent in the graphs. Black stripes with majority voting result in the best detection rates of TPR value of 81.4% and FPR value of 19.0%. Conversely, the worst detection rate was on the gold stripes with TPR of 56.0% and FPR of 44.0% FPR. Although further experimentation revealed that although color is a good heuristic indicator for the coercivity of a card, it is not always a reliable indicator of the level of coercivity.

The same two-group (original, copy) independent means difference t-test as with credit and debit cards was performed against the closed-loop gift card set. In the instant case, the null hypothesis was that there is no statistical difference between measured jitter on the original and counterfeit cards. The calculated Cohen's d-value was 0.316 from the individual swipe sets and r-effect size was 0.16. Although the effect size is smaller than that for credit or debit cards, the calculated p-value was 0.05 with a power of 0.999. Accordingly, the null hypothesis was rejected and a high probability of a distinct statistical difference exists between the original closed-loop gift cards and counterfeit cards.

Additionally, the detection system was tested on 26 open-loop gift cards. The experimentation steps were the same as with credit and debit cards. Each card was read and then copied by the encoder. Both the original and counterfeit gift cards were swiped 10 times. The system recorded the duration of each swipe and the distance (both in number of samples) between each clocking flux transitions. The $V_J$ values of the original and counterfeit closed loop gift cards were compared and 23 of 26 of the original cards displayed a lower variance than the counterfeit cards. By examining arbitrary swipes, a TPR of 75.8% and a FPR of 24.2% were obtained. A majority voting scheme coupled with the optimal threshold calculated over arbitrary swipes yielded an improved TPR value of 88.5% and a reduced FPR value of 19.2%.

The same two-group (original, copy) independent means difference t-test as with credit and debit cards was performed against the open-loop gift card set. In the instant case, the null hypothesis was that there is no statistical difference between measured jitter on the original and counterfeit cards. The calculated Cohen's d-value was 1.023 from the individual swipe sets and r-effect size was 0.46. Although the effect size is smaller than that for credit or debit cards, the calculated p-value was 0.0000001 with a power of 1.0. Accordingly, the null hypothesis was rejected and a high probability of a distinct statistical difference exists between original open-loop gift cards and counterfeit cards. These results lead to the conclusion that implementation of a majority voting scheme increases the reliability of the detection system.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] Card manufacturing. https://www.fiserv.com/customer-channelmanagement/output-solutions/card-manufacturing.aspx.
[2] Magnetic Field Visualization. http://www.matesy.de/en/products/magnetic-fieldvisualization/.
[3] Magnetic Stripe Analyser. http://www.barnestest.com/wpcontent/uploads/2014/10/Barnes-Mag-Tester-Revo-10-14.pdf.
[4] PayPal. https://www.paypal.com.
[5] Square Cash. https://cash.me.
[6] Welcome to MagnePrintR: What is MagnePrint? http://www.magneprint.com/.
[7] Some retailers balking at pump upgrade for EMV cards. http://www.nacsonline.com/Media/Daily/Pages/ND1008145.aspx, 2014.
[8] ABC News. Credit card thieves caught on tape using skimmers, 2014.
[9] ABC News. Why chip credit cards are still not safe from fraud, 2016.
[10] D. Abrazhevich. Classification and characteristics of electronic payment systems. In Electronic Commerce and Web Technologies, Lecture Notes in Computer Science. Springer Berlin Heidelberg, 2001.
[11] D. Abrazhevich. Electronic Payment Systems: a User-Centered Perspective and Interaction Design. Technische Universiteit Eindhoven, 2004.
[12] ACCPAconnection. Credit card skimming operation, 2008.
[13] Aftholderberg. HWR MagStripe production at 15,000 cph.avi, 2011.
[14] American Underworld. Report on carding, skimming, 2012.
[15] R. Anderson and S. J. Murdoch. EMV: Why payment systems fail. Communications of the ACM, 57(6), 2014.
[16] M. Bond, O. Choudary, S. J. Murdoch, S. Skorobogatov, and R. Anderson. Chip and skim: Cloning EMV cards with the pre-play attack. In 2014 IEEE Symposium on Security and Privacy (S& P), 2014.
[17] G. Bresiger. Unused gift cards total $44B since 2008: study, 26 Jan. 2014.
[18] D. Chaum. Achieving electronic privacy. Scientific American, 1992.
[19] E. K. Clemons, D. C. Croson, and B. W. Weber. Reengineering money: the mondex stored value card and beyond. In Proceedings of the Twenty-Ninth Hawaii System Sciences, 1996, International Conference on, volume 4, 1996.
[20] M. Corkery. Wells fargo fined $185 million for fraudulently opening accounts. The New York Times, 2016.
[21] M. Dautner. Card fraud losses reach $21.84 billion in 2015, 2016.
[22] J. de Ruiter and E. Poll. Formal analysis of the EMV protocol suite. In S. M¨ odersheim and C. Palamidessi, editors, Theory of Security and Applications, Lecture Notes in Computer Science. Springer Berlin Heidelberg, 2011.
[23] S. Drimer and S. J. Murdoch. Chip & PIN (EMV) relay attacks.
[24] S. Drimer and S. J. Murdoch. Keep your enemies close: Distance bounding against smartcard relay attacks. USENIX Security, 2007.
[25] M. Hamblen. Chip card payment confusion, anger rages on—Merchants blame card companies for delays in certifying EMV software. Computerworld—http://vvww-.computerworld.com/article/3059379/mobile-payments/chip-card-payment-confusion-anger-rages-on.html, 2016.
[26] E. Harrell. Victims of identity theft, 2014, 2015.
[27] T. E. Holmes. Payment Method Statistics. Creditcards.com—http://www.creditcards.com/credit-card-news/payment-method-statistics-1276.php, 2015.
[28] ISO. Identification cards—recording technique—magnetic stripe—low coercivity. 7811-2:2014(E), 2014.
[29] ISO/IEC. Identification cards—recording technique—magnetic stripe—high coercivity. 7811-6:2014/(E), 2014.
[30] JDFriend100. Cloning credit cards, 2009.
[31] T. H. Johansen and D. Shantsev. Magneto-Optical Imaging. Nato Science Series II. Springer Netherlands, 2012.

[32] T. L. Jones and G. R. L. Higgins. Value transfer system, 1998.
[33] J. P. Morgan Chase. FAQ: Chip-enabled card acceptance (EMV). https://www. chasepaymentech.com/faq emv chip card technology.html, 2016.
[34] G. O. Karame, E. Androulaki, and S. Capkun. Double-spending fast payments in bitcoin. In Proceedings of the 2012 ACM Conference on Computer and Communications Security (CCS), CCS '12, New York, N.Y., USA, 2012. ACM.
[35] B. Krebs. All about fraud: How crooks get the CVV, 2016.
[36] P. Lucas. Card makers look to fill their EMV dance card, 2013. http://www.digitaltransactions.net/news/story/Card-Makers-Look-To-Fill-Their-EMV-Dance-Card-.
[37] M. S. Manasse and Others. The millicent protocols for electronic commerce. In USENIX Workshop on Electronic Commerce. usenix.org, 1995.
[38] S. McQuay. Why you might not see an emv-ready gas pump for a while, 2015.
[39] G. Medvinsky and C. Neuman. NetCash: A design for practical electronic currency on the internet. In Proceedings of the 1st ACM Conference on Computer and Communications Security, (CCS) '93, 1993.
[40] S. Meiklejohn. If privacy matters, cash is still king. The New York Times, 2013.
[41] S. J. Murdoch, S. Drimer, R. Anderson, and M. Bond. Chip and PIN is broken. In 2010 IEEE Symposium on Security and Privacy (S& P), 2010.
[42] S. Nakamoto. Bitcoin: A peer-to-peer electronic cash system, 2008.
[43] B. C. Neuman. Proxy-based authorization and accounting for distributed systems. In [1993] Proceedings. The 13th International Conference on Distributed Computing Systems.
[44] B. C. Neuman and G. Medvinsky. Requirements for network payment: the NetCheque perspective. In Compcon '95. 'Technologies for the Information Superhighway', Digest of Papers, 1995.
[45] N. J. Nicol. No expectation of privacy in bank records—united states v. miller. 26 DePaul L. Rev. 146, 1976.
[46] D. OMahony, M. Peirce, and H. Tewari. 7 electronic payment systems. 1997.
[47] P. Panurach. Money in electronic commerce: Digital cash, electronic fund transfer, and ecash. Communications of the ACM, 39(6), 1996.
[48] W. C. Patterson, N. Garraud, E. E. Shorman, and D. P. Arnold. A magneto-optical microscope for quantitative measurement of magnetic microstructures. The Review of scientific instruments, 86(9), 2015.
[49] B. Reaves, N. Scaife, A. Bates, P. Traynor, and K. R. B. Butler. Mo(bile) money, mo(bile) problems: analysis of branchless banking applications in the developing world. In 24th USENIX Security Symposium (USENIX Security 15), 2015.
[50] C. Uriarte. Paythink gift card fraud will be a major threat post-emv, 2015.
[51] P. Wayner. Digital Cash (2nd Ed.): Commerce on the Net. Academic Press Professional, Inc., San Diego, Calif., USA, 1997.

What is claimed is:

1. A method for detecting a counterfeit magnetic stripe, the method comprising:
providing an encoded magnetic stripe;
placing the encoded magnetic stripe under a magneto-optical imaging device;
capturing, by the magneto-optical imaging device, a magnetic stripe image of the encoded magnetic stripe; and
providing a computer readable medium comprising stored instructions that when executed causes at least one processor to:
receive the magnetic strip image;
process the magnetic stripe image to recover each clocking flux transition along the encoded magnetic stripe;
identify each location of the clocking flux transitions along the encoded magnetic stripe;
measure a distance between each successive clocking flux transition;
calculate a variance of the measured distances between each of the successive the clocking flux transitions;
determine a critical value ($V_J$) based on the mean of the measured distances of the clocking flux transitions;
compare the critical value $V_J$ of the encoded magnetic stripe to a standardized value for $V_J$; and
determine whether the encoded magnetic stripe is counterfeit based on the compared critical value $V_J$ of the encoded magnetic strip and the standardized value for $V_J$.

2. The method of claim 1, wherein the magnetic strip is encoded with frequency/double frequency (F2F) technique.

3. The method of claim 1, wherein the magneto-optical imaging device is a magneto-optical microscope using a bismuth substituted yttrium iron garnet growth over a gadolinium gallium substrate, covered by an aluminum reflective layer, and a sapphire protection layer as a magneto-optical indicator film.

4. The method according to claim 1, wherein a first 10% of the distances between clocking flux transitions are discarded and not used in determining $V_3$, and wherein the first 10% refers to the initial 10% of a spatial distance along the encoded magnetic stripe.

5. The method of claim 4, wherein, if the $V_J$ of the magnetic stripe differs from the standardized value for $V_J$ by more than a predetermined threshold value, the encoded magnetic stripe is determined to be counterfeit.

6. The method of claim 5, wherein the processor is further configured to insert the absolute locations of each clocking flux transition in a vector D as follows:

$$D = \langle p_1 - p_0 \ldots p_m - p_{m-1} \rangle$$

wherein $p_k$ is a location of clocking flux transition.

7. The method of claim 6, wherein the processor is further configured to take a distance of vector D and store the distance in vector J as follows:

$$J = \langle |D_1 - D_0| \ldots |D_{m-1} - D_{m-2}| \rangle .$$

8. The method of claim 7, wherein determining the $V_J$ of the magnetic stripe comprises using the following formula:

$$V_J = \frac{\sum_{k=0}^{|J|-1} (J_k - \mu_J)^2}{|J|},$$

wherein, $\mu_J$ is the mean of J, and $|J|$ is the length of J.

9. The method of claim 1, wherein the measurement of distances is only the distances between full-clock transitions.

* * * * *

UNITED STATES PATENT AND TRADEMARK OFFICE
CERTIFICATE OF CORRECTION

PATENT NO.        : 10,803,261 B2
APPLICATION NO.   : 15/961060
DATED             : October 13, 2020
INVENTOR(S)       : Traynor et al.

Page 1 of 1

It is certified that error appears in the above-identified patent and that said Letters Patent is hereby corrected as shown below:

On the Title Page

"Related U.S. Application Data
(60) Provisional application No. 62/495,548, filed on May 1, 2017"

Should read:
--Related U.S. Application Data
(60) Provisional application No. 62/492,548, filed on May 1, 2017--

Signed and Sealed this
Twenty-ninth Day of December, 2020

Andrei Iancu
*Director of the United States Patent and Trademark Office*